(12) United States Patent
Yamaguchi et al.

(10) Patent No.: US 6,508,897 B1
(45) Date of Patent: Jan. 21, 2003

(54) POROUS FIBROUS STRUCTURE AND PROCESS FOR PRODUCING THE SAME

(75) Inventors: Tosirou Yamaguchi, Osaka (JP); Hisaharu Kuwahara, Kurashiki (JP); Hirokuni Tanii, Osaka (JP)

(73) Assignee: Kuraray Co., Ltd., Kurashiki (JP)

( * ) Notice: Subject to any disclaimer, the term of this patent is extended or adjusted under 35 U.S.C. 154(b) by 164 days.

(21) Appl. No.: 09/688,200

(22) Filed: Oct. 16, 2000

(30) Foreign Application Priority Data

Oct. 15, 1999 (JP) .......................................... 11-293679

(51) Int. Cl.⁷ ................................................. B32B 5/18
(52) U.S. Cl. .................... 156/77; 156/180; 156/181; 156/272.2; 156/296; 156/308.8; 264/41; 264/109
(58) Field of Search .................... 156/77, 180, 181, 156/272.2, 308.2, 296, 308.8; 264/109, 41

(56) References Cited

U.S. PATENT DOCUMENTS

| 4,246,357 A | 1/1981 | Hobes et al. |
| 4,269,713 A | 5/1981 | Yamashita et al. |
| 5,677,360 A | 10/1997 | Yamamori et al. |
| 5,766,758 A | 6/1998 | Hirakawa et al. |

FOREIGN PATENT DOCUMENTS

| EP | 0 525 204 | | 2/1993 |
| JP | 57066200 A | * | 4/1982 |
| JP | 59-76959 | | 2/1984 |
| JP | 60-28565 | | 2/1985 |
| JP | 63235558 A | * | 3/1987 |

* cited by examiner

Primary Examiner—Sam Chuan Yao
(74) Attorney, Agent, or Firm—Oblon, Spivak, McClelland, Maier & Neustadt, P.C.

(57) ABSTRACT

A novel porous fibrous structure containing from 10 to 100% by weight of wet heat bonding fibers, having cellular cavities in the fibrous structure of the fibers, in which a plurality of indefinite cellular cavities are present independently or in a state of partially connected in the inside of the fibrous structure, at least a portion of the fibers constituting the fibrous structure is heat bonding by the wet heat bonding fibers, and a process for producing such porous fibrous structure.

8 Claims, 8 Drawing Sheets

Feeder No.

POROUS FIBROUS STRUCTURE AND PROCESS FOR PRODUCING THE SAME

BACKGROUND OF THE INVENTION

1. Field of the Invention

This invention concerns a porous fibrous structure and, more in particular, it relates to a novel porous fibrous structure having a plurality of indefinite cellular cavities inside the fibrous structure and a manufacturing method thereof.

2. Description of the Prior Art

Products prepared by bonding non-woven fabrics or block form fibrous structures with adhesives or adhesive fibers have been generally used. Such products are required for bulkiness depending on the application uses, for which various proposals have been made. For example, a method of impregnating a fibrous structure with a foaming agent to provide bulkiness by foaming of the agent and a method of dissolving water soluble fibers out of the fibrous structure containing the water soluble fibers thereby providing bulkiness have been proposed. Although such prior art techniques provide bulkiness to some extent to the fibrous structure, their effect is extremely small.

Further, in the former method, since the fibers are embedded in the foamed resin, property inherent to the fibers such as softness and hygroscopic property can not be developed. In the latter method, the size of the cavity formed between the fibers is not larger than that of the fibers removed by dissolution and, as a result, the porosity is restricted and the utilization factor of the fibers is reduced since the starting fibers are partially removed by dissolution.

Further, Japanese Published Unexamined Patent Application Sho 59-76959 and Sho 60-28565 disclose non-woven fabrics obtained by mixing polypropylene fibers formed by incorporating azodicarboxylic acid amide as a blowing agent into the surface of the fibers thereby forming a plurality of fine cleft holes to the surface with binder fibers and applying heat treatment. However, the non-woven fabric obtained by this method has no cellular cavities in the non-woven fabric but this intends to modify the surface smoothness of the synthetic fibers by the presence of fine cleft holes on the surface of the fibers. On the other hand, wadding is applied as filling fibers or core materials of mattresses and stuffed dolls but any of them has uniform structure in which wadding is entangled at random and has no cellular cavities.

Fibrous structures consisting only of fibers and with extremely high porosity having indefinite cellular cavities have not yet been known.

OBJECT OF THE INVENTION

This invention intends to provide a novel fibrous structure having an entangled structure of fibers and cellular cavities together, as well as a manufacturing method thereof.

SUMMARY OF THE INVENTION

The foregoing object can be attained in accordance with this invention in a porous fibrous structure containing from 10 to 100% by weight of wet heat bonding fibers, in which a plurality of indefinite cellular cavities are present independently or in a state that a plurality of them are connected partially in the inside of the fibrous structure, and at least a portion of the fibers constituting the fibrous structure are heat bonded by the wet heat bonding fibers.

Further, this invention also provides a process for producing a porous fibrous structure, which comprises impregnating a fibrous structure containing from 10 to 100% by weight of wet heat bonding fibers with water, then heating the water-containing fibrous structure to evolve bubbles by boiling water in the fibrous structure, and forming a plurality of indefinite cavities in the inside of the fibrous structure and, simultaneously, heat bonding at least a portion of the fibers constituting the fibrous structure by the wet heat bonding fibers.

The wet heat bonding fibers contained in the porous fibrous structure according to this invention are fibers containing a polymer which is softened in hot water at about 95 to 100° C. and bond to each other or bond to other fibers.

An example of such polymer can include an ethylene-vinyl alcohol copolymer. The ethylene-vinyl alcohol copolymer means a copolymer in which ethylene residues are copolymerized by 10 to 60 mol% to vinyl alcohol residues. The copolymer copolymerized with 30 to 50 mol% of the ethylene residues are preferred in view of the wet heat bonding property. Further, the vinyl alcohol moiety preferably has a saponification degree of 95 mol% or more. The large content of the ethylene residue can provide a specific nature of not soluble in hot water while having wet heat bonding property. The degree of polymerization can be selected optionally and it is usually about from 400 to 1500. After preparing an aimed porous fibrous structure, the ethylene-vinyl alcohol copolymer can be partially crosslinked for post fabrication such as provision of dyeability and modification of fibers.

Other polymers showing the wet heat bonding property can include, for example, a copolymer containing acryloamide and polylactic acid.

The wet heat bonding fiber may comprise the copolymer described above alone, or may conjugated fibers with other thermoplastic polymer or fibers formed by coating the copolymer to fibers comprising other thermoplastic polymer. It is necessary that the other thermoplastic polymer has higher melting point than the ethylene-vinyl alcohol copolymer in view of the heat resistance and dimension stability, and a thermoplastic polymer having a melting point of 150° C. or higher is preferred and it can include, specifically, polyester, polyamide and polypropylene.

The polyester can include those fibers-forming polyesters comprising aromatic dicarboxylic acids such as terephthalic acid, isophthalic acid, naphthalene-2,6-dicarboxylic acid, phthalic acid, α,β-(4-carboxyphenoxy) ethane, 4,4'-dicarboxydiphenyl and 5-sodium sulfoisophthalic acid; aliphatic dicarboxylic acid such as azelaic acid, adipic acid or sebasic acid or esters thereof; and diols such as ethylene glycol, diethylene glycol, 1,3-propane diol, 1,4-butane diol, 1,6-hexane diol, neopentyl glycol, cyclohexane-1,4-dimethanol, polyethylene glycol and polytetramethylene glycol. It is preferred that 80 mol% or more of the constituent units are ethylene terephthalate unit.

The polyamide can include, for example, aliphatic polyamide and semi-aromatic polyamide containing nylon 6, nylon 66 or nylon 12 and it may be a polyamide containing a smaller amount of a third ingredient.

In a case of conjugated fibers comprising an ethylene-vinyl alcohol copolymer and other thermoplastic polymer, the compositional ratio is preferably as the former to the latter ratio (weight ratio) =10:90 to 90:10, particularly, 30:70 to 70:30 in view of the spinnability. There is no particular restriction for the conjugated fiber so long as it is a known conjugated form, and it can include core-sheath type, eccentric core-sheath type, multi-layered type, side-by-side type, random conjugated type and radial conjugated type providing that the copolymer is exposed at least partially of the fiber surface, preferably, by 50% or more. The cross sectional shape of the fibers may not be restricted to a solid circular cross sectional or modified cross sectional shape, but it may be various cross sectional shapes such as macaroni shape.

In a case of using them as a cleaning appliance for human body, cosmetic appliance and cleaning appliance for precision apparatus or-noble metal products, it is preferred that split type conjugated fibers are used as the composite fibers, to form a porous fibrous structure comprising single fibers of 0.1 denier or less and, preferably, 0.01 denier or less, in view of feeling and wiping performance.

Further, in the fibers formed by coating the ethylene-vinyl alcohol copolymer to other thermoplastic fibers, it is preferred that the copolymers covers the surface of other fibers by ⅓ or more and, preferably, ½ or more.

It is necessary that the porous fibrous structure of this invention contains the wet heat bonding fibers by 10 to 100% by weight, preferably, 30 to 100% by weight and, further preferably, 50 to 100% by weight. If the wet heat bonding fibers are less than 10% by weight, adhesion of the fibers is insufficient to make the formation of the cellular cavities. The porous fibrous structure is not particularly restricted to woven or knitted products, non-woven fabrics, block form fibrous structures and composite structures thereof, and wadding type or shaped fibrous structures and various kind of needle-punched non-woven fabrics are included. Further, other non-woven fabrics, cloths, films and network-like products may be laminated or sandwiched therewith.

Further, the porous fibrous structure is not restricted to those of plane structure but it may be formed into arbitrary three dimensional indefinite shapes such as of rectangular boxes, cylinders, spheres, dolls or animals. For example, three dimensional porous fibrous structure manufactured by blowing fibers into a shaping mold formed into the shape described above can also be used.

On the other hand, other fibers than the wet heat bonding fibers constituting the porous fibrous structure are not particularly restricted but natural fibers, semi-synthetic fibers and synthetic fibers can be used and they are selected depending on the purposes of application.

The cellular cavities formed in the porous fibrous structure according to this invention have various indefinite shapes including spherical shapes and cloud-type shapes, and are hollow cavities having a size capable of being distinguished clearly from the intra-fiber spaces of the fibers constituting the porous fibrous structure. The size of major axis of the cellular cavities distributes widely from about 1 mm to about 30 mm. The cellular cavities are present in the porous fibrous structure independently or in a state where a plurality of them are connected partially. The independent or continuous shape of the cellular cavities is not restricted particularly but of such a shape as visually observed in a specimen or an enlarged photograph thereof. With a micro point of view, a cellular cavity contiguous for several tens centimeters may exist.

The porous fibrous structure according to this invention has a feature in having a plurality of large cavities with a major diameter of about 5 mm or more. The porosity can be determined optionally depending on the amount of the wet heat bonding fibers, the accumulation density of the fibers and the wet heat treating conditions and it is preferably about 80% or more, and, further preferably, 90% or more of the porosity according to the mercury porosimetery.

The cavities are formed without using the foaming agent at all, and have a structure not found in the conventional porous fibrous structures. Referring to the cavities in this invention, the fibrous structure containing wet heat bonding fibers is impregnated with water, the water-containing fibrous structure is heat treated at about 100° C., that is, at a boiling point of water to form a great amount of bubbles in the fibrous structure, the fibers of the structure are moved by the bubbles, the resultant spaces form cellular cavities in the fibrous structure, the wet heat bonding fibers are melted simultaneously by the heat to fix the inner wall surface of the cavities, and fibers in other portions are bonded to each other to form an entangled structure.

According to this invention, formation of the cellular cavities and heat bonding of the fibers are taken place simultaneously by the combination of the wet heat bonding fibers and heating with boiling water to form a porous fibrous structure.

The porous fibrous structure according to this invention can be formed as a homogeneous porous fibrous structure having the cellular cavities entirely and also formed as a so-called asymmetric structure having a dense layer on one surface thereof and a porous fibrous layer in contiguous therewith. It is of course possible to use known adhesive or blowing agent for a secondary purpose.

DESCRIPTION OF PREFERRED EMBODIMENTS

A structure of a porous fibrous structure having cellular cavities according to this invention is to be explained in more details with reference to the drawings.

Figure 1:
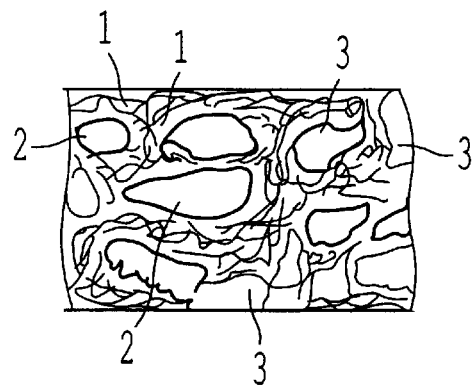
FIG. 1 is a schematic cross sectional view illustrating a porous fibrous structure according to this invention.

FIG. 1 is a schematic cross sectional view illustrating a porous fibrous structure according to this invention.

A plurality of fibers 1 are entangled at random to constitute porous fibrous structure which has at the inside independent cellular cavities 2 and cellular cavities 3 formed by a plurality of cavities connected partially. The independent cellular cavity is a cavity constituting a defined space, and the cellular cavity connected partially is a cavity having narrow connecting portions in the cavity or pores at the inner wall and of a shape in connection with the adjacent cavities. Fibers 1 are melted by means of wet heat bonding fibers at the intersections and junctions between each of the fibers, and the porous fibrous structure itself has sufficient shape retainability and strength.

Figure 2:
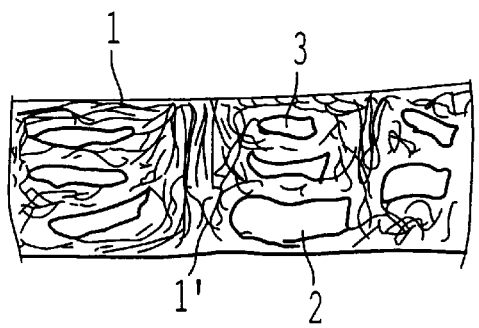
FIG. 2 is a schematic cross sectional view illustrating another example of a porous fibrous structure according to this invention.

FIG. 2 is a schematic cross sectional view illustrating another example of the porous fibrous structure according to this invention.

A plurality of fibers 1 constitute a non-woven fabric formed generally in a layerous manner in which independent cellular cavities 2 and a plurality of cellular cavities 3 comprising a plurality of cavities connected partially, most of which are formed with the major axis being along the lateral direction in the non-woven fabric layer. Since most of fibers are arranged layerous in the non-woven fabric, the cellular cavities formed by the movement of the fibers take a laterally long shape.

Further, fibers 1' arranged along the direction of the thickness of the non-woven fabric are partially present in the layer. The fibers 1' are fibers entangled in the direction of the thickness caused upon needle punching of the non-woven fabric. In the porous fibrous structure in FIG. 2, since the formation of the cellular cavities is controlled by the entanglement of fibers in the direction of the thickness by the needle punching, the cellular cavities tend to become smaller compared with the porous fibrous structure in FIG. 1.

Figure 3:
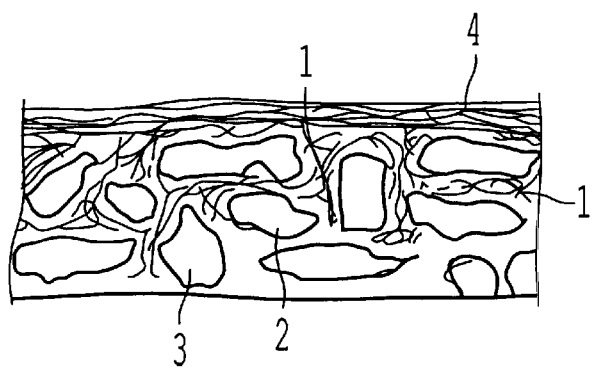
FIG. 3 is a schematic cross sectional view illustrating a further example of a porous fibrous structure according to this invention.

FIG. 3 is a schematic cross sectional view illustrating a further example of porous fibrous structure according to this invention.

The porous fibrous structure has a dense layer 4 on one surface and a porous fibrous layer in contiguous therewith, and the porous fibrous layer comprises entangled fibers 1, independent cellular cavities 2 and cellular cavities 3 partially in communication. The structure of the dense layer 4 can include various forms such as a structure similar with a film or a structure of a loose fiber web depending on the type and the amount of constituent fibers and on condition of the heat treatment. The dense layer 4 has no substantially cellular cavities as defined in this invention.

A process for producing a porous fibrous structure according to this invention is to be explained below with reference to an example of using needle punched non-woven fabric.

The needle punched non-woven fabric is obtained, for example, by mixing the wet heat bonding fibers and the polyethylene terephthalate fibers, and then passing them by way of a carding step through needling step. In this case needling may also be applied by laminating two kinds of card webs which made different in the type of the bonding fibers and/or in the mixing ratio of the wet heat bonding fibers. One of the factors for controlling the size of the cellular cavities is to properly change the punching density.

The present inventors have found that a plurality of indefinite cellular cavities can be formed in the fibrous structure by impregnating a fibrous structure containing wet heat bonding fibers, heating the water-containing fibrous structure and applying a wet heat treatment under the condition of making bubbles in the fibrous structure. For the treatment, a sufficient amount of water to generate bubbles under heating is necessary. The bubbles form the cellular cavities in the fibrous structure. By the way, even when bubbles are formed in the layer of the fibrous structure and the fibers are moved, the cellular cavities are not formed unless the structure is fixed in the fibrous structure. For forming the cellular cavities in the fibrous structure, wet heat bonding fibers are necessary. That is, the wet heat bonding fibers are heated and melted to form and fix the cellular cavities under the influence of the bubbles. The foregoings are indispensable conditions of this invention.

Heating required for generating the bubbles in the fibrous structure depends on the pressure of the heating atmosphere, which is usually about 100° C. at 1 atm. When the heating is conducted under a reduced or elevated pressure, the boiling temperature changes depending on the atmospheric pressure. It is important that the fibrous structure are heated under the presence of a sufficient quantity of bubbles. The heating temperature also relates to the melting temperature of the wet heat bonding fibers. The heating temperature is preferably at a melting temperature of the wet heat bonding fibers, or at a temperature higher than that by less than 10° C. The wet heat processing time can be controlled, for example, depending on the amount of the fibrous structure or the extent of fusing of the fibers.

This invention has a feature in that neither organic solvent nor foaming agent is necessary at all for forming the cellular cavities. Accordingly, burdens on the environment and operators are extremely small and the manufacturing cost can also be reduced. This merits provide a significant practical effect.

The water-containing fibrous structure can be heated by blowing of steams or heating by heating with high frequency microwaves, for example, microwaves at 2450 MHz. The microwave heating is preferred since bubbles can be generated easily in the fibrous layer. Further, the structure for the surface of the fibrous structure can be controlled by heating the fibrous structure in a completely immersed state in water or in a state of partially exposing the same to an atmospheric phase. When the fibrous structure is wet heat treated in a state immersed in water, substantially uniform cellular cavities can be provided inside the structure. When the structure is wet heat processed in a state of exposing the surface, the surface can be formed into a dense layer. It is one of excellent advantages of this invention that the surface structure of the porous fibrous structure can be controlled by such a simple method.

After melting the wet heat bonding fibers, the fibrous structure is cooled by a well-known method to fix the structure of the porous fibrous structure. Since the fibrous structure after the wet heat treatment contains hot water, it is preferably immersed in cold water or cooled by cold water shower. Cooling by cold air is poor in the efficiency. When the fibrous structure is compressed before sufficient cooling, the cellular cavities may possibly be deformed. On the other hand, the cellular cavities can be controlled also by utilizing the compression treatment.

After cooling the fibrous structure, it is squeezed and/or dried at a ordinary temperature or by hot blow and then wound up on a take-up roller. In the case of block forms, they are dried independently.

When the performance of the porous fibrous structure according to this invention is measured in the form of a non-woven fabric product, it has excellent performance such as tensile strength of 1 kg/cm or more, residual elongation of 2.7% at 10% elongation after 6 hours, a porosity of 80% or more, compression recovery: 90% or more at 50% compression and heat conductivity of 0.05 kcal/m·h·° C.

The porous fibrous structure according to this invention can be formed into any arbitrary shape. Further, in the method of this invention, it is possible to restrict growing of bubbles in the fiber bundles by constraining the fiber bundle at a portion thereby forming small cellular cavities with small bubbles at the constrained portion. In this case, larger bubbles are formed gradually toward the free end of the fiber bundle to form large cellular cavities. As a result, a structure having a plurality of indefinite cellular cavities which are arranged with gradually larger sizes from the dense portion of the fiber bundle is obtained.

By utilizing the basic constitution described above, the structure of the unit fiber bundle can be prepared independently, in linear arrangement or plane arrangement to form porous fibrous structures of spherical, columnar or sheet-like shape.

Further, the porous fibrous structure can be manufactured by combining said porous structures with other fabric, non-woven fabric, strand or film. As an example of such a structure, it is possible to provide the fibrous structure with a spongy property. Typical examples are to be explained specifically.

For example, after constraining a fiber bundle containing wet heat bonding fibers gathered into a strand of about 5 cm length by winding a wet heat bonding fibers or different yarns at a position for substantially bisecting the bundle in the longitudinal direction, they are immersed in a water-filled vessel and irradiated with high frequency microwaves for heating in a state of causing bubbles from the inside of the fiber bundle to obtain a spherical porous fibrous structure.

Further, a continuous fiber strand is prepared by providing a plurality of fiber bundles of about 5 cm length containing wet heat bonding fibers, and a continuous fiber strand constrained about at the middle point of each of the fiber bundles with a wet heat bonding fibers or different fibers is prepared (usually referred to also as chenille yarn). A columnar porous fibrous structure can be obtained by heating the fiber strand under irradiation of high frequency microwaves in a state of causing bubbles from the inside of the constrained material in the same manner as described above.

Further, a fiber strand containing wet heat bonding fibers are formed into cut piles, and a boa knit fabric is knitted using another strands as a base yarn. A sheet-like porous fibrous structure can be obtained by irradiating the high frequency microwaves to the resultant knitted fabric in the same manner as described above and heating the same while generating bubbles from the inside of the knitted fabric.

Further, a sheet-like porous fibrous structure can also be obtained by arranging in parallel or several tens of continuous fiber bundles of chenille yarns used in the columnar fibrous structure and fixing them with yarns to form a sheet and then applying wet heat treatment with the high frequency microwaves.

Further, a sheet-like fibrous structure can be obtained also by making a spiral arrangement of chenille continuous fiber and applying a wet heat treatment by high frequency microwaves.

Further, it is also possible to obtain a porous fibrous structure of any optional three dimensional shape corresponding to a mold by applying wet heat treatment with high frequency microwaves after blowing or charging constrained short fiber bundles or continuous fiber bundles into the appropriate mold.

According to this invention, in the portions constrained by the wet heat bonding fibers or other fibers as described above, fibers are arranged densely in the fibrous structure obtained finally, the arrangement of the fibers become coarser as receding from constrained portion, and a great amount of indefinite cellular cavities are present in a state of gradually increasing the size from the dense portion to the coarse portion.

When observing the thus obtained porous fibrous structure finely, it is similar with the structure of sponge. That is, it has a network-like structure, in which cellular cavities open partially to the surface of the fibrous structure and fibers ate melted at the inside. When comparing the structure with that of natural sponge, the openings at the surface, the cellular cavities at the inside and the network-like structure of the fibers are similar with those of sponge. The thus obtained spherical, columnar or sheet-like porous fibrous structure is similar with natural sponge as it is in view of the appearance and can be used as a substituent for sponge. Further, they may be properly cut as required to form a product.

Now, the fibrous structure before fabrication of the porous fibrous structure (hereinafter sometime referred to as a precursor) and the structure of the porous fibrous structure after the fabrication according to this invention will be explained more in details with reference to the drawings.

Figure 4:
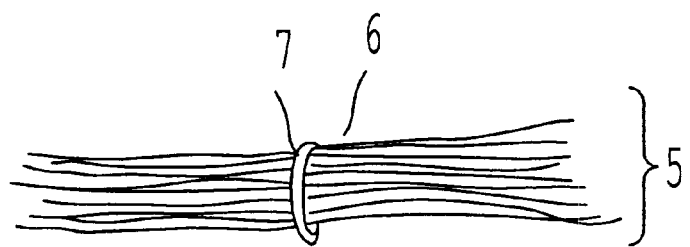
FIG. 4 is a schematic view illustrating an example of a precursor for manufacturing spherical porous fibrous structure according to this invention.

FIG. 4 is a schematic view illustrating an example of a precursor for manufacturing a spherical porous fibrous structure according to this invention. The drawing shows a precursor in which a fiber bundle 5 containing wet heat bonding fibers of uniform length is constrained by another fiber 7 at a position 6 for bisecting the bundle.

Figure 5:
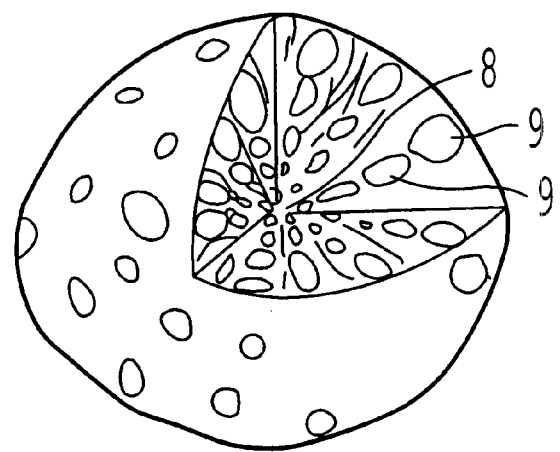
FIG. 5 is a partially cut-out schematic cross sectional view of a spherical porous fibrous structure according to this invention.

FIG. 5 is a partially cut away schematic cross sectional view for a spherical porous fibrous structure obtained from the precursor shown in FIG. 4. The fibrous structure has a dense structure at a central portion 8 with the movement of the fibers being constrained, from which cellular cavities 9 are radially formed therefrom while being gradually enlarged toward the surface of the fibrous structure. A portion of the cellular cavities opens at the surface. Other portion of the fibrous structure has a fibrous network structure in which the fibers are melted. Referring to the fibers, crimped fibers give more bulkiness to easily form the spherical shape. If the amount of the fiber is small, the structure tends to become not a spherical but a disk-like shape. As the length of the fiber bundle increases, more fibers are required.

Figure 6:
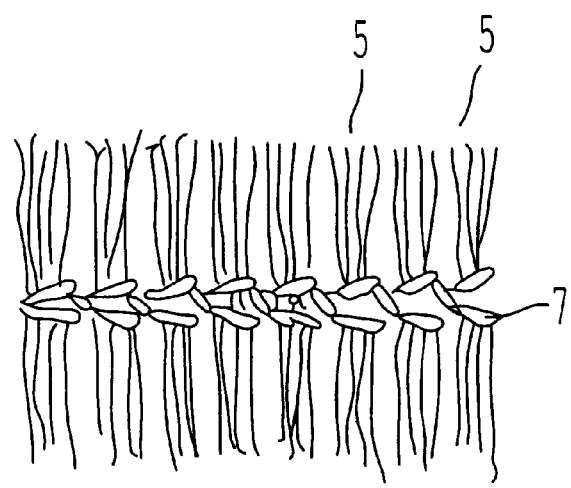
FIG. 6 is a schematic view illustrating an example of a precursor for manufacturing a columnar porous fibrous structure according to this invention.

FIG. 6 is a schematic view illustrating an example of a precursor of a columnar porous fibrous structure according to this invention. This example is prepared by a known flange method as a method of forming piles or mops of dusters, which is a fiber bundle comprising a plurality of fiber bundles 5 constrained by knitting with another fibers 7.

Figure 7:
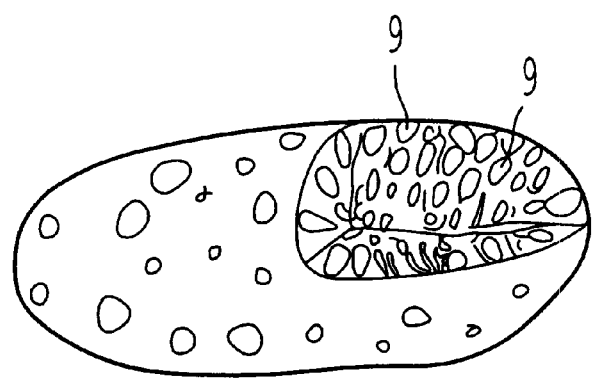
FIG. 7 is a partially cut-out schematic cross sectional view of a columnar porous fibrous structure according to this invention.

FIG. 7 is a partially cut away schematic cross sectional view for a columnar porous fibrous structure obtained from the fiber bundle shown in FIG. 6.

In the inner structure of the porous fibrous structure, dense portions of fibers formed by constraining of the fiber bundles are linearly arranged at the center, and cellular cavities 9 are formed being gradually enlarged substantially in the circumferential direction along a circular cross section at a right angle relative to center line. It is considered that the structure is obtained by the formation of the cellular cavities at the inside of the unitary fiber bundles. Other portions of the fibrous structure have the same network-structure as that shown in FIG. 5.

Figure 8:
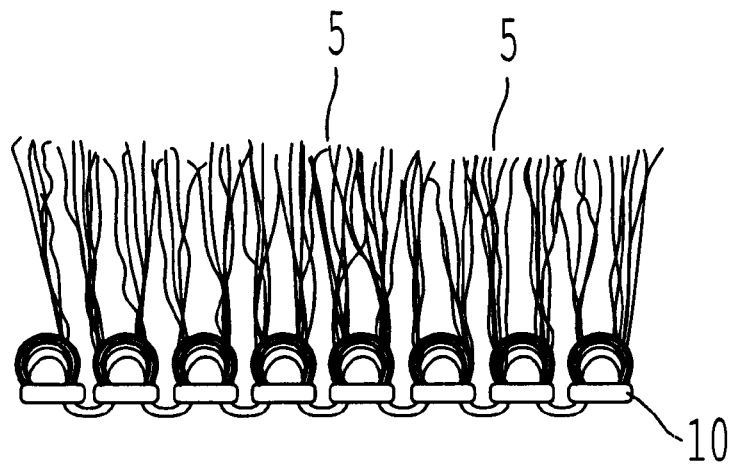
FIG. 8 is a schematic view illustrating an example of a precursor for manufacturing a sheet-like porous fibrous structure according to this invention.
Figure 9:
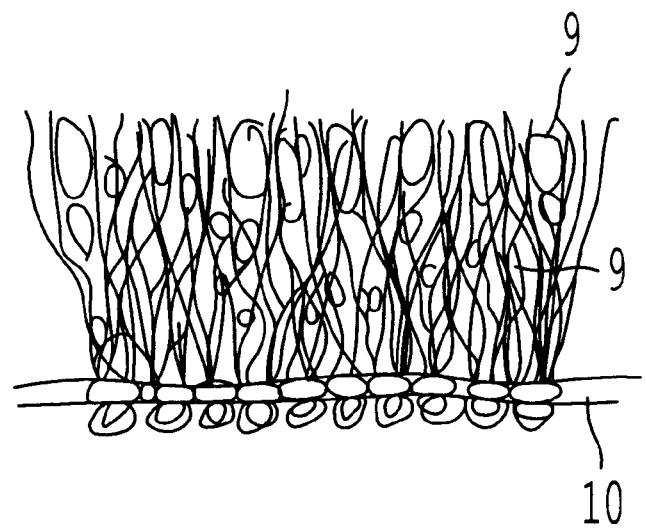
FIG. 9 is an enlarged schematic cross sectional view of a sheet-like porous fibrous structure according to this invention.

FIG. 8 is a schematic view illustrating an example of a precursor for manufacturing a sheet-like porous fibrous structure according to this invention. The drawing shows a cross sectional structure of a cut pile sheet fabric formed by constraining the fiber bundles 5 with base yarns 10. FIG. 9 is a schematic cross sectional view of a sheet-like porous fibrous structure obtained from the sheet fabric shown in FIG. 8. Fibers are arranged densely on the plane of the base yarn portion, and the cellular cavities are formed while being gradually enlarged substantially linearly from the dense portion to the surface of the porous fibrous layer. It is considered that the formation of gradually enlarged cavity structure depends on the gradual change in freedom of erected fibers from base yarn part to tip of the fiber bundles.

Figure 10:
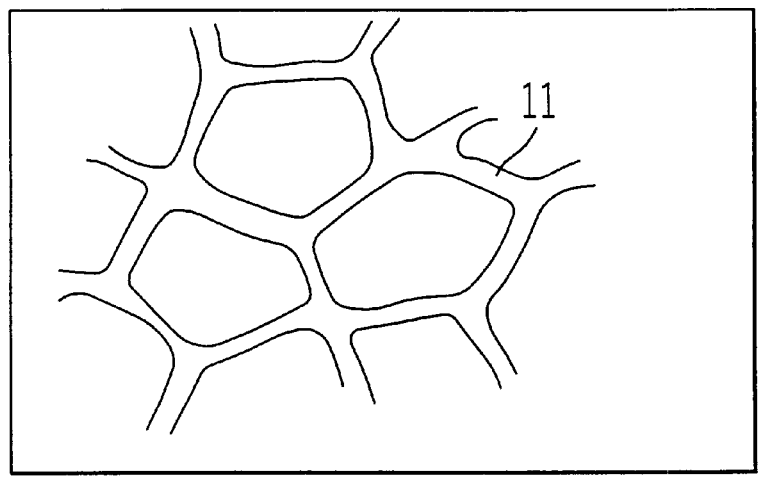
FIG. 10 is an enlarged schematic view illustrating a network structure of natural sponge.

FIG. 10 is a schematic enlarged view illustrating the network structure of natural sponge. The sponge comprises fibrous skeleton 11 and has cellular cavities at the inside of the sponge. Most of the fibrous skeletons have a pentagonal network-like structure.

Figure 11:
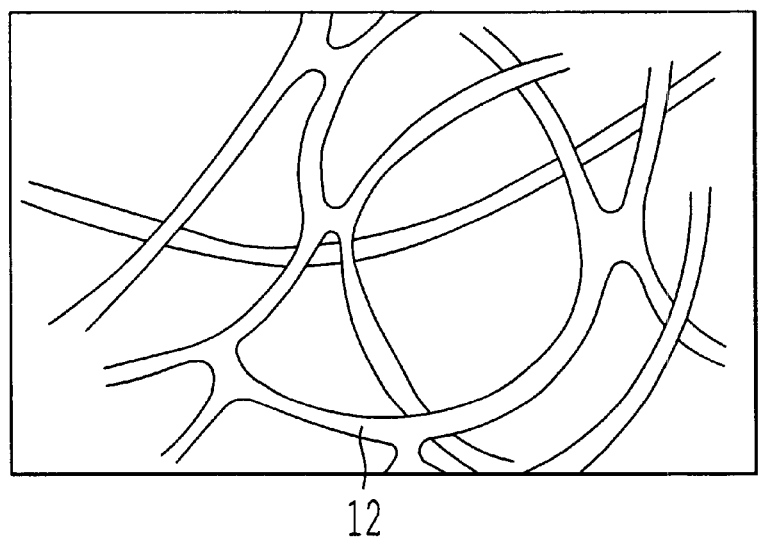
FIG. 11 is an enlarged schematic view illustrating the structure of porous fibrous structure according to this invention.

FIG. 11 is an enlarged model view illustrating the structure of the porous fibrous structure according to this invention. The drawing shows a state in which the wet heat bonding fibers 12 in the portions other than the cellular cavities are melted and bonded to each other at a plurality of points of contacts and point of intersections. When FIG. 10 and FIG. 11 are compared, it is considered that the porous fibrous structure according to this invention has no distinct pentagonal structure but has a fibrous skeleton similar therewith, and this shows a sponge-like form since it also has cellular cavities disposed with the directionality in the structure.

Further, one of the features of the porous fibrous structure according to this invention is that the structure is not shaped by blowing or charging short fibers at random but portions of the short fibers have constrained portions and, accordingly, the fibers scarcely fall away from the surface and from inside of the product.

When the porous fibrous structure according to this invention and sponge are compared in view of the property, the density of sponge is from 0.01 to 0.04 $g/cm^3$ whereas the density of the porous fibrous structure according to this invention is from 0.06 to 0.15 $g/cm^3$, which is higher by about 10 times. This is because a high density portions of the fibers are present in the porous fibrous structure according to this invention and, when compared at the cellular cavity containing layer, the density is similar with that of sponge.

Then, modified embodiments of the multi-layer composite containing the porous fibrous structure according to this invention is to be explained.

The porous fibrous structure according to this invention can be formed into a porous fibrous multi-layer composite by lamination with a support layer. The porous fibrous multi-layer composite comprises at least one support layer and a fibrous layer containing a plurality of indefinite cellular cavities joined with the support layer (hereinafter referred to as the present porous fibrous layer). One of the embodiments is a porous fibrous multi-layer composite in which the present porous fibrous layer is laminated on one surface or both surfaces of one support layer. In this structure, the present porous fibrous layer is exposed to one surface or both surfaces of the laminate.

Another embodiment is a porous fibrous multi-layer composite comprising two support layers and the present porous fibrous layer is present therebetween. In this structure, the present porous fibrous layer is present between the support layers and is not exposed to the surface. Such a structures can be accumulated overlaid to a multi-layered form.

The support layer referred to in this invention is a layer-not substantially having cellular cavities which is substantially dense and less deformable layer. Such a layer can include, for example, a fibrous layer, a film, a sheet and a foamed layer. The fibrous layer can include knitted or woven fabrics, various kinds of non-woven fabrics and network-like products. The film, sheet and foamed material are molded from various kinds of resins and the thickness and the surface fabrication therefor are optionally selected depending on the purpose. The support layer and the present porous fibrous layer can be joined by weaving or knitting, bonding, fusion and mechanical entanglement such as needle punching.

A structure of a porous fibrous multi-layer composite having cellular cavities according to this invention is to be explained specifically with reference to the drawings.

Figure 12:
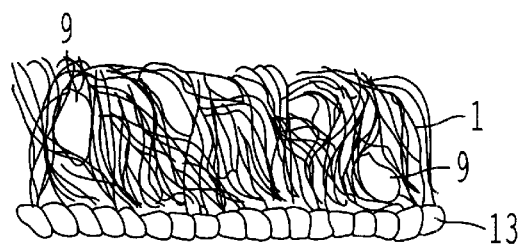
FIG. 12 is a schematic cross sectional view of a porous fibrous multi-layer composite having a porous fibrous layer on one surface of a support layer.

FIG. 12 shows a schematic cross sectional view of a porous fibrous multi-layer composite having a porous fibrous layer on the surface of a support layer as an example of a porous fibrous multi-layer composite according to this invention. While this cross sectional views shows a structure obtained by a tubular knitted fabric, the structure of the support layer is not restricted only thereto.

In FIG. 12, a plurality of fibers 1 fixed to a support layer 13 are entangled at random to form the present porous fibrous layer, which has indefinite cellular cavities 9 in the inside. The plurality of fibers 1 contain wet heat boonding fibers, and the fibers are melted at intersections in the cellular cavities to form inner wall surfaces of the cellular cavities. Further, the present porous fibrous layer is bonded with wet heat bonding fibers.

Figure 13:
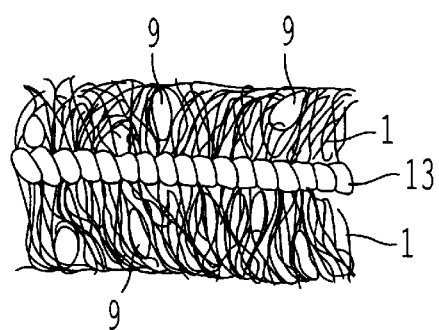
FIG. 13 is a schematic cross sectional view of a porous fibrous multi-layer composite having two porous fibrous layers on both surfaces of a support layer.

FIG. 13 shows another example of the porous fibrous multi-layer composite according to this invention and a porous fibrous multi-layer composite having two porous fibrous layers on both surfaces of a support layer is shown in a schematic cross sectional view. This structure is also obtained from tubular knitted fabric but structure of the support layer is not restricted only thereto.

In FIG. 13, a plurality of fibers 1 fixed to the support layer 13 are entangled at random to form the present porous fibrous layer, which has a plurality of indefinite cellular cavities 9 in the inside. The plurality of fibers 1 contain wet heat bonding fibers and the fibers are melted at the intersections in the cellular cavities to form the inner wall surface of the cellular cavities.

Figure 14:
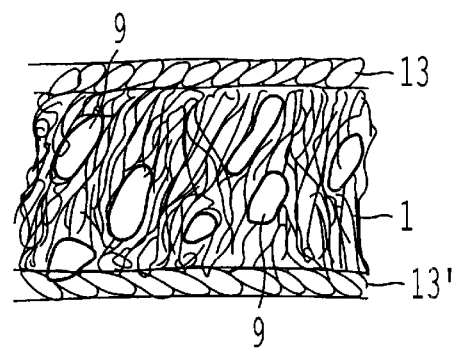
FIG. 14 is a schematic cross sectional view of a porous fibrous multi-layer composite put between two support layers.

FIG. 14 shows a further example of the porous fibrous multi-layer composite according to this invention, and illustrates a schematic cross sectional view of a porous fibrous multi-layer composite having the present porous fibrous layer put between two support layers. While this example is obtained from circular knitted fabric, the structure of the support layer is not restricted only thereto.

In FIG. 14, the present porous fibrous layer is formed by entanglement of a plurality of fibers 1 between a support layer 13 and a support layer 13', in which a plurality of cellular cavities 3 are present. When the plane of the fibrous layer is observed along the boundary between the support layer 1 or 1' and the fibrous layer, portions of the cellular cavities in communication with each other in the plane are observed and it is recognized that the cellular cavities include those being present independently or those of a continuous shape.

It is not always necessary that the material for the support layer 1 and the support layer 1' are identical in view of the fiber composition or the material but they may be made of different materials.

The porous fibrous multi-layer composite according to this invention can be manufactured by various kinds of methods. Regarding knitting methods, single circular knitted fabrics, interlock circular knitted fabrics, tricot knitted fabrics, raschel knitted fabrics, double raschel knitted fabrics, multiple woven fabrics and laminated non-woven fabrics may be used. As an example, description is to be made to a process for producing the porous fibrous multi-layer composite according to this invention by using a circular knitted as a corrugated fabrics capable of ensuring thickness due to the long connecting yarns among interlock circular knitted fabrics.

The corrugated knitting fabrics can be obtained by using a double knitting machine of 30 inch diameter and 20 gauge. As an example, they are obtained by knitting in interlock tuck stitch using the wet heat bonding fibers are used as connecting yarns and the laminate is knitted by both tack pattern and knitting the side for the cylinder and the dial only with the polyethylene terephthalate fibers. Proper change of the knitting machine gauge can constitute one of factors for adjusting the thickness of the fibrous layer and controlling the size of the cellular cavities.

Further, in this invention, the multi-layer composite can be obtained also by forming a melted dense layer to a porous fibrous structure. Such a laminate has smooth surface and an air permeable layer can be formed by controlling the degree of the fusion. Further, it is possible to control the sound proofness and heat insulation as a feature of the porous fibrous structure by forming the melted dense layer.

In the method of forming the dense fiber melted layer on the surface of the fibrous layer, the surface of the fibrous layer after the wet heat treatment described above is heated under pressure by usual method, by which the wet heat bonding fibers of the surface layer are melted and resolidified to form a dense layer with a smooth surface. As a continuous hot pressing method, a method of heating with a hot roller at 180° C. is preferred.

Such a dense fiber melted layer forms a network structure in which the wet heat bonding fibers are entangled and fixed at random under the observation of a scanning electron microscopic photograph and it has a layer thickness of about 100 μm or more, preferably, about 300 μm or more, and has a plurality of penetrating fine pores. The thickness and the diameter of the fine pores in the dense layer can be controlled depending on the kind of the wet heat bonding fibers and the content thereof, as well as heat pressing conditions. The dense layer in the porous fibrous multi-layer composite according to this invention is a fiber entangled layer formed by melting the wet heat bonding fibers and melting and binding them with other fibers, which is smooth and has air permeability.

The shape of the porous fibrous multi-layer composite having the dense fiber melted layer according to this invention may be in any optional shape. This invention has a feature in the surface structure and the inner structure and there is no restriction on the shape in the appearance. The structure of the fibrous multi-layer composite according to this invention is to be explained in details with reference to the drawings.

Figure 15:
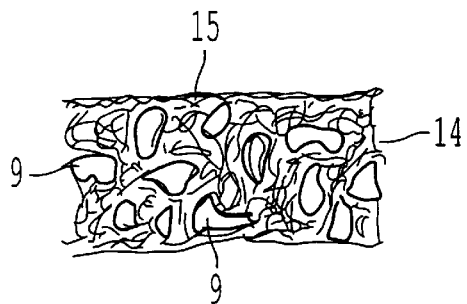
FIG. 15 is a schematic cross sectional view illustrating an example of a sheet-like porous fibrous multi-layer composite according to this invention.

FIG. 15 is a schematic cross sectional view illustrating an example of a sheet-like porous fibrous multi-layer composite having a dense fiber melted layer according to this invention. In a porous fibrous layer 14, fibers are arranged at random, and most of cellular cavities 9 formed in the fibrous layer are indefinite in the shape. A dense fiber melted layer 15 is present on one surface of the fibrous layer 14.

Figure 16:
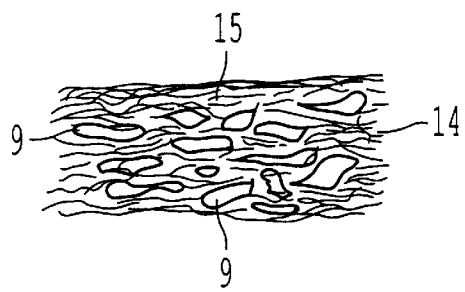
FIG. 16 is a schematic cross sectional view illustrating another example of a sheet-like porous fibrous multi-layer composite according to this invention.

FIG. 16 is a schematic cross sectional view illustrating another example of a sheet-like porous fibrous multi-layer composite having a dense fiber melted layer according to this invention. In the porous fibrous layer 14, fibers are arranged substantially in parallel with the plane of the fibrous layer and most of the cellular cavities 9 formed in the fibrous layer also have a shape along the plane of the fibrous layer. A dense fiber melted layer 15 is present on one surface of the fibrous layer 14.

Figure 17:
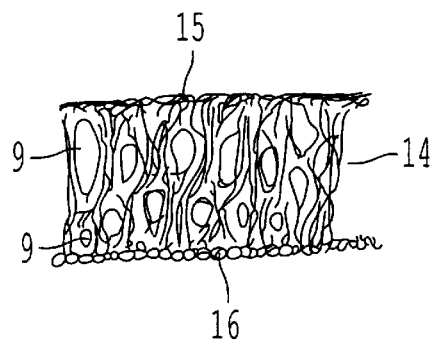
FIG. 17 is a schematic cross sectional view illustrating a further example of a sheet-like porous fibrous multi-layer composite according to this invention.

FIG. 17 is a schematic cross sectional view illustrating another example of a sheet-like porous fibrous multi-layer composite having a fibrous melted dense layer according to this invention. Fibers of the porous fibrous layer 14 are located vertically on the fibrous support layer 16, and most of the cellular cavities 9 formed in the fibrous layer have a shape of gradually enlarging from the support layer to the opposite surface along the fibers set vertically to the cellular cavity portions 9 formed in the fibrous layer. A fibrous melted dense layer 15 is present on one surface of the fibrous layer 14 (opposite side relative to the support layer).

Figure 18:
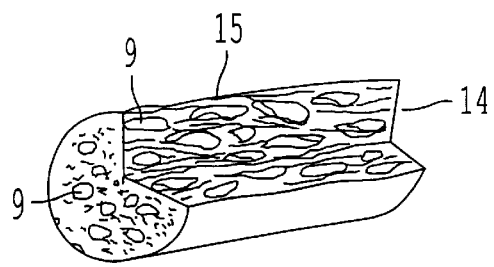
FIG. 18 is a partially cut-away schematic view illustrating an example of a cylindrical porous fibrous multi-layer composite according to this invention.

FIG. 18 is a partially cut-out schematic view showing another embodiment of a porous fibrous multi-layer composite having a dense fiber melted layer according to this invention. In the porous fibrous layer 14, fibers are arranged cylindrically along the major axis, and most of cellular cavities 9 formed in the fibrous layer have a shape arranged in the longitudinal direction along the fibers arranged on the cellular cavity portions formed in the fibrous layer. A dense fiber melted layer 15 is present on the outer surface of the columnar fibrous layer 14.

Figure 19:
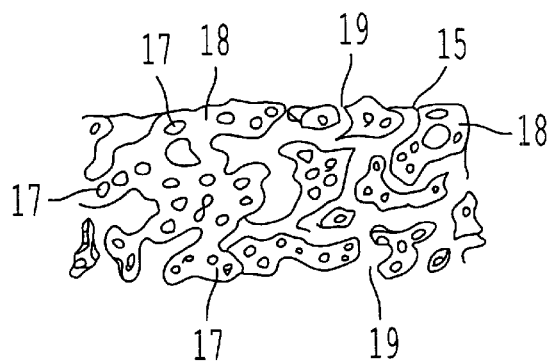
FIG. 19 is an enlarged cross sectional view illustrating a structure of a dense melted fibrous layer according to this invention.

FIG. 19 is an enlarged cross sectional view illustrating the structure of a dense fiber melted layer according to this invention. In the dense fiber melted layer 15, fibers 17 other than the wet heat bonding fibers, for example, polyester fibers are covered with a molten polymer layer 18 in which the wet heat bonding fibers are melted and they have fine connection pores 19 between them.

A process for producing a porous fibrous multi-layer composite having a typical fiber melted layer is to be explained.

As an example of manufacturing a sheet-like porous fibrous multi-layer composite, a method starting from a moquette fabric as a precursor can be mentioned. A dense fiber melted layer is formed on the surface of a moquette fabric by weaving wet heat bonding fibers as cut pile yarns, immersing the surface of the thus obtained moquette fabric with water, irradiating microwaves and heating while causing bubbles from the inside of the moquette fabric to form cellular cavities and then heat press bonding them with a hot cylinder. Further, it is possible to adopt a method of heat press bonding with a hot cylinder to the surface of a moquette fabric to form a dense fiber fused layer, then irradiating microwaves while immersing the moquette fabric with water and heating while generating bubbles from the inside of the moquette fabric. In this method, a fibrous composite structure comprising a dense fiber melted layer and a fibrous layer not having cellular cavities is obtained as an intermediate product. While the intermediate product has no cellular cavities, it can be used as a product for different purpose.

The sheet-like porous fibrous multi-layer composite can be used in the same manner also by using a fiber web comprising usual long fibers or short fibers in addition to the use of the moquette fabric described above. Further, the fiber web may be of a random fiber arrangement or a fiber arrangement substantially in parallel with the fiber web plane. Depending on the arrangement of the fibers, the cellular cavities formed in the fibrous layer tends to form a irregular shape or a shape along the plane of the fibrous layer.

Further, as another example of a process for producing the porous fibrous multi-layer composite, a columnar multi-layer composite as shown in FIG. 18 can be obtained by passing a fiber bundle of about 100,000 denier containing wet heat bonding fibers while in contact with the inner wall of a hollow heater. The pressure of contact can be controlled by restricting the diameter of the hollow heater. This method can form a dense fiber melted layer at the surface. Then, the fiber bundle is immersed in a water-filled vessel continuously as it is or being cut into a desired length, and heated under generation of bubbles from the fiber bundle by the irradiation of microwaves to form cellular cavities in the inside. An identical product can also be obtained by the method with procedures being reversed to the above.

The porous fibrous structure according to this invention can be used, by utilizing its porosity, to applications with a purpose of adsorbing and discharging liquids, sound absorption, heat insulation, cushioning and filtration. Specifically, this can be used in industrial applications such as draining materials, wipers, paint rollers, ink absorbents, curing sheets, air filters and liquid filters; various kinds of absorbents, sanitary materials and filter materials for medical uses, substrates for carpets, substrate for mattresses, substrates for chairs, wall coating materials, substrates for artificial leathers, waddings for mattresses, wrapping materials and brushes for daily necessaries.

Particularly, the porous fibrous structure according to this invention is effectively used for cleaning materials.

The fibrous shaping products for cleaning materials according to this invention can be used as articles of spherical, cylindrical, stick-like, plate-like or like other arbitrary indefinite three dimensional shapes.

The porous fibrous structures as mentioned above are not restricted to their size. For example, spherical shaped products which are used cleaning appliances for inside of the tubes preferably have 2 to 10 mm diameter.

The fibers constituting the fibrous layer may be of a uniform composition or a mixture of several kinds of fibers. In a case of the mixture, the melted fiber portion has a complicate structure, which is suitable to the control of porous structure, water absorption or feeling. The condition for the fibers to be mixed or controlled includes blending ratio, denier, cut length and absence or presence of crimping and elongation rate of the wet heat bonding fibers. A mixture of fibers different in one or more of the conditions may be used integrally or as a composite layer changing the conditions between a plurality of layers.

Referring to an example by a slab system for obtaining a fibrous shaped product for cleaning materials of a porous fibrous structure of uniform constitution according to this invention, a fibrous shaped product can be obtained by mixing 50% wet heat bonding cut fibers and 50% polyethylene terephthalate wadding, and applying carding to obtain a card sliver and then charging the same into a cylindrical or rectangular vessel, introducing water into the vessel, impregnating sufficient amount of water into the sliver and then applying a heat treatment to them by the method described above.

The density of the fiber shaped product can be controlled by the kind and the amount of the fiber to be charged or the amount of fibers and the amount of water.

The shaped product just after formation can be used in the shape as it is for the cleaning material, but the appearance and the quality can be determined by press cutting into a predetermined size or shape. Further, for controlling the smoothless or the density of the cut face, the product may be treated again in boiling water.

Further, as a form of the wet heat bonding fibers, a shaped product can also be obtained by introducing the filaments, in addition to the cut fiber, into a vessel by using an appropriate filling device and applying the treatments as described above.

Then, a manufacturing method of a slab system for obtaining fiber shaping product for cleaning materials having a fibrous structure of a plurality of layers is to be explained.

A card sliver obtained by carding 100% wet heat bonding fibers and card sliver obtained by mixing 60% of wet heat bonding fibers of a larger fiber denier than the former wet heat bonding fibers in the single fiber denier and 40% of polyethylene terephthalate of a large denier are prepared and then, they are carded together. They were charged so as to be laminated into the vessel described above. In this case, each of the slivers may be charged alternately or laminated in an irregular manner. Alternatively, they may be adjacent with each other. In this manner, a porous fibrous structure having different fibrous layers, which is unable to make by fiber mixing can be obtained. After charging the fibers in the vessel, a wet heat treatment is applied in the same manner as described above to obtain an aimed shaping product.

EXAMPLE

This invention is to be explained with reference to examples but the invention is not restricted to them.

Example 1

Manufacturing Method of Fibers

Core/sheath composite staple fibers each of 3 denier and cut length of 51 mm were obtained by using polyethylene terephthalate (having an intrinsic viscosity of 0.68 measured at 30° C. in an equi-weight liquid mixture of phenol/ tetrachloro ethane) containing 3% by weight of fine silica particles as a core polymer and using an ethylene-vinyl alcohol copolymer as a sheath polymer with an ethylene content of 40 mol % and MI=10 and by way of spinning, stretching and crimping steps.

Manufacture of Needle Punched Non-woven Fabric

A needle punched non-woven fabric with punching density of 130 cycles/cm$^2$, weight of 150 g/m$^2$ and 3 mm thickness was obtained by using 40% core/sheath composite staple fibers described above and 60% polyethylene terephthalate staple fibers having 3 denier and 51 mm cut length.

Manufacture of Non-woven Fabric Having Cellular Cavities

The needle punched non-woven fabric described above was thoroughly impregnated with water at a ordinary temperature, kept in boiling water at 100° C., and applied with wet heat treatment for 30 seconds while being retained by with a net such that the non-woven fabric was kept in water. After the treatment, the non-woven fabric was taken out and immersed in cooling water at ordinary temperature to be cooled and settled. Then, after centrifugal dewatering, it was dried at a dry heat of 110° C.

In the cross section of the thus obtained non-woven fabric, fiber bundle penetrating in the direction of the thickness are distributed substantially uniformly as the needling traces, and a plurality of large cavities each of 1 mm to 5 mm could be confirmed between the fiber bundles. On the other hand, when the surface of the non-woven fabric was sliced to observe the state in the inside, indefinite cellular cavities were present and cavities present independently and cellular cavities connected partially were could also be confirmed.

Example 2

A first layer web was prepared by using 40% core/sheath composite staple fibers and 60% polyethylene terephthalate staple fibers having 3 denier and 51 mm cut length as used in Example 1, and a web of a second layer was prepared by using 100% raw wadding of polyethylene terephthalate stable fibers with 3 denier and 51 mm cut length. They were laminated to obtain a needle punched non-woven fabric having punching density of 160 cycle/cm$^2$, weight of 250 g/m$^2$ and 10 mm thickness.

Subsequently, in the same manner as in Example 1, the non-woven fabric was kept in boiling water at 100° C., then charged in cooling water and settled and, after centrifugal dewatering, applied with hot blow drying at a dry heat of 110° C.

In the thus obtained non-woven fabric, a plurality of cellular cavities could be confirmed in the same manner as in Example 1 in the cross section of the first layer with the interface to the second layer as a boundary. On the other hand, in the second layer consisting only of the polyethylene terephthalate staple fibers, 2-dimensional entanglement of wadding at high density due to the shrinkage of the fibers by boiling water could be recognized. As described above, a non-woven fabric having an asymmetric cross sectional structure could be obtained.

Example 3

A thin web was manufactured by a card by mixing 40% core/sheath composite staple fibers as used in Example 1, 55% raw wadding of polyethylene terephthalate staple fibers having 3 denier and 51 mm cut-length and 5% binder fiber containing a low melting polyester having a melting temperature of 120° C. at a dry heat. They were laminated and placed between nets, and the webs were temporarily adhered to each other using a hot air blow at 130° C. at which the low melting polyester is melted, to obtain a block form laminated structure with a weight of 800 g/m$^2$.

The thus obtained block form laminated structure was kept in boiling water at 100° C., immersed in cooling water to be cooled and settled and, after dewatering with an air blow, it was dried by hot blow at a dry heat of 110° C. in the same manner as in Example 1.

In the cross section of the thus obtained block form laminated structure, elongate cellular cavities were present intermittently along the interface of the laminate and indefinite independently or partially connected cellular cavities could be confirmed in the direction of the plane.

Example 4

The block form laminate as used in Example 3 was kept in water to about ½ height of the thickness, to which microwaves at 2450 MHz were irradiated for 3 minutes to boil water impregnated into the block form laminated structure and then the laminated structure was kept in water at a ordinary temperature for cooling.

In the cross section of the thus obtained block form laminated structure, identical cellular cavities with those in Example 3 were present only in the water immersed portion, while the portion out of water had a melted entangled fiber structure. That is, this block form laminated structure was of an asymmetric structure.

Example 5

Manufacturing Method of Fibers

Core/sheath composite fibers were obtained by using polyethylene terephthalate (having an intrinsic viscosity of 0.68 measured at 30° C. in an equi-weight liquid mixture of phenol/tetrachloro ethane) containing 3% by weight of fine silica particles as a core polymer and using an ethylene-vinyl alcohol copolymer with an ethylene content of 40 mol % and MI=10 as a sheath polymer (core/sheath ratio=50/50, 150 denier/48 filament).

The fibers were applied with false twisting at a number of twist of 2350 T/M, a temperature of a first heater of 120° C. and temperature of a second heater of 135° C., to obtain false twist yarns with a crimping extension of 17%.

Then, the false twist yarns were gathered into a gathered bundle of 10,000 denier, which was cut into 5 cm length. The cut fiber bundle was tightly tied by the wet heat bonding twist yarn at the position for equally dividing the length to obtain constrained fiber bundles with free ends.

After charging the fiber bundles and a sufficient amount of water at ordinary temperature to allow them to be kept into a cylindrical vessel capable of containing liquid and applying a heat treatment for about one minute in a state of evolving bubbles by the irradiation of high frequency microwaves of 1 KW at 2450 MHz, the shaped product was cooled by using cold water and then centrifugally dewater to obtain a spherical porous fibrous structure. The obtained porous fibrous structure had a density of 0.11 g/cm$^3$ and it could be confirmed to be a porous structure in view of the surface. Further, in view of the cross section, it could be confirmed that the structure had a hard portion having a high density at the central portion, cellular cavities were arranged radially toward the surface and, further, the size of the cavity was increased toward the surface.

Example 6

After joining 100 false twist yarns of wet heat bonding fibers with 150 denier used in Example 5 to increase to 15,000 denier, flange fabrication was applied to a cut length of 3 mm. The flange fabricated precursor and water were charged into a rectangular vessel capable of containing liquid and, when heated under the irradiation of high frequency microwaves in the same manner as in Example 5, bubbles evolved violently from the fiber bundles and crimping of the yarns was developed to obtain a spongy columnar porous fibrous structure.

The thus obtained porous fibrous structure had a density of 0.15 g/cm$^3$ and was of an inner structure having cellular cavities gradually enlarging toward the surface. It was soft in touch and showed excellent bubbling upon contact with a detergent.

Example 7

Two false twist yarns used in Example 5 were joined into a fiber bundle of 300 denier (cut pile) and a circular knit boa was knitted using this fiber bundle and the polyester false twist yarn of 150 denier as a base yarn.

The knitted fabric described above was cut into a circular shape of 10 cm diameter, which was placed in a cylindrical vessel and then a sufficient amount of water to allow the fabric to be immersed therein was poured and high frequency microwaves were irradiated.

By the heating under the irradiation of the high frequency microwaves, bubbles evolved violently from the cut pile portion of the knitted fabric and the cut pile yarns were crimped to form a porous structure.

After dipping the structure into cold water to settle the shape, it was centrifugally dewatered to obtain a sheet-like porous fibrous structure. In the thus obtained sheet-like porous fibrous structure, when the base yarn portions were separated by cutting from the cut pile portion and the density of the cut pile portion was measured, it was 0.09 g/cm$^3$ and the size of the cellular cavities was increased from the base yarn portion toward the surface.

Example 8
Manufacture of Circular Corrugated Knitted Fabric

Figure 20:
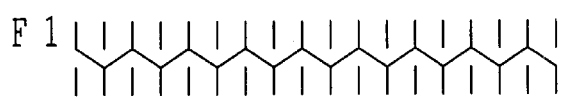
FIG. 20 is a knitting structural view employed in Example 8.
Figure 20:
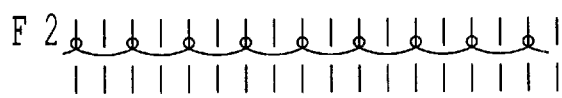
Figure 20:
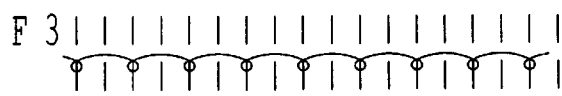
Figure 20:
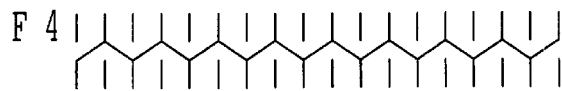
Figure 20:
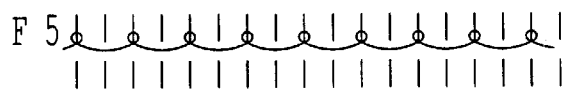
Figure 20:
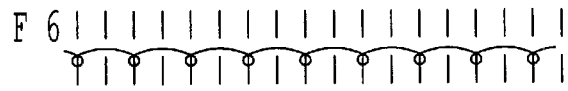

A double knitting machine of 31 inches, 20 gauge was set so as to provide a knitting pattern shown in FIG. 20, and false twist yarns used in Example 5 were fed to feeders No. F1 and F4 and 48 filament polyethylene terephthalate false twist yarns of 150 denier were supplied to feeders Nos. F2, F3, F5 and F6 to obtain a circular knitted corrugated fabric of 6 mm thickness and 1180 g/m$^2$ of weight.
Manufacture of Porous Fibrous Multi-layer Composite The tubular corrugated knitted fabric described above was thoroughly impregnated with water at a ordinary temperature and kept in boiling water at 100° C. and then applied with a wet heat treatment for 30 seconds while being kept by nets in the water. After the treatment, the knitted fabric was taken out and dipped in cooling water at a ordinary temperature for cooling and settling. Then, after centrifugal dewatering, it was dried at a dry heat of 110° C.

In the cross section of the obtained knitted fabric, fiber bundles connected in the direction of the thickness formed a sponge layer and a number of indefinite cellular cavities with a major diameter of about 1 mm to 5 mm could be confirmed.

On the other hand, when the inner plane state of the knitted fabric was observed by slicing near the boundary between one side and the sponge layer of the knitted fabric, it could be confirmed that a plurality of fine cellular cavities like coral reef were present although they were of an indefinite shaped.

The thus obtained porous fibrous multi-layer composite did not sink but float when pored into water and the porous fibrous multi-layer composite was softened when absorbing a great amount of water.

Example 9
Manufacture of Fleecy Knitted Fabric

A sinker pile knitted fabric with 790 g/m$^2$ of weight was obtained by knitting the core/sheath composite filament false twist yarns used in Example 5 as pile yarns and 48 filament polyethylene terephthalate false twist yarns of 150 denier as base yarns by using a sinker pile knitting machine of 30 inches, 20 gauge, 2.7 mm sinker length.

After scraping out the pile yarns from the both surfaces on the pile side and the counter pile side of the thus obtained sinker pile knitted fabric by using a raising machine, a shearing treatment was applied to obtain a fleecy knitted fabric.
Manufacture of Porous Fibrous Multi-layer Composite The fleecy knitted fabric described above was immersed thoroughly in water at a ordinary temperature and then kept into boiling water at 100° C. and applied with a wet heat treatment for 30 seconds while the knitted fabric was kept in water. After the treatment, the knitted fabric was taken out and dipped in cooling water at a ordinary temperature for cooling and settling. Then, after centrifugal dewatering, it was dried at a dry heat of 110° C.

In the cross section of the thus obtained knitted fabric, fiber bundles which were pile yarns before the hot water treatment formed a sponge layer and a number of indefinite cellular cavities with the major diameter of about 1 mm to 5 mm could be confirmed.

On the other hand, when the plane state in the inside was observed by slicing the knitted fabric near the surface, it could be confirmed that a plurality of fine cellular cavities were present like coral reef although they were indefinite in the shape as in Example 8.

In the same manner as in Example 8, the thus obtained porous fibrous multi-layer composite did not sink but float when poured into water and, further, the porous fibrous multi-layer composite was softened when adsorbing the sufficient amount of water.

Example 10
Manufacture of Laminated Needle Punched Non-woven Fabric

A card web comprising 40% core/sheath composite staple fibers used in Example 1 and 60% polyethylene terephthalate staple fiber with 3 denier and 51 mm cut length, and a polyester spun bond non-woven fabric were laminated to form a composite structure by needling, to obtain a laminated needle punched non-woven fabric with 600 g/m$^2$ of weight and 5 mm thickness.
Manufacture of Porous Fibrous Multi-layer Composite The laminated needle punched non-woven fabric described above was immersed thoroughly in water at a ordinary temperature and then kept into boiling water at 100° C. and applied with a wet heat treatment for 30 seconds while the knitted fabric was kept in water by nets. After the treatment, the laminated needle punched non-woven fabric was taken out and dipped in cooling water at a ordinary temperature for cooling and settling. Then, after centrifugal dewatering, it was dried at a dry heat of 110° C.

In the cross section of the thus obtained laminated needle punched non-woven fabric, fiber bundles penetrating through and connecting the support fibrous layer were distributed substantially uniformly as needling traces, and a plurality of large cavities with the major diameter of about 1 mm to 5 mm could be confirmed between the fiber bundles. On the other hand, when the plane state inside the laminated needle punched non-woven fabric was observed by slicing the surface, indefinite cellular cavities were present and independent cavities and partially connected cellular cavities could also been confirmed.

In the same manner as in Example 8, the thus obtained porous fibrous multi-layer composite did not sink but float when poured into water and, further, the porous fibrous multi-layer composite was softened when adsorbing a sufficient amount of water.

Example 11
Manufacture of Non-woven Fabric Composited by Lamination

A non-woven fabric with 570 g/m² of weight was obtained by needle punching a card web used in Example 10. Then, polyurethane foam with 70 g/m² of weight was fused by flame lamination to the non-woven fabric on the side of the polyurethane foam and appended therewith by adhering with one surface of the non-woven fabric. Further, another polyurethane foam with 70 g/m² of weight was appended to another surface of the bonded fabric in the same manner as above by flame lamination to obtain a laminate having polyurethane foam as support layers and the non-woven fabric as sandwiched layer.

Manufacture of Porous Fibrous Multi-layer Composite

The fibrous multi-layer composite having the polyurethane foam as the support layers and the non-woven fabric sandwiched therein was sufficiently impregnated with water at a ordinary temperature, kept in boiling water at 100° C. and applied with a wet heat treatment for 30 seconds while being kept in water. After the treatment, the multi-layer composite was taken out and dipped into cooling water at a ordinary temperature for cooling and settling. Then, after centrifugal dewatering, it was dried at dry heat of 110° C.

In the cross section of thus obtained multi-layer composite, fiber bundles penetrating and connecting by needling were distributed substantially uniformly as needling traces in the non-woven fabric sandwiched by polyurethane foams, and a plurality of indefinite cavities with the major diameter of about 1 mm to 5 mm could be confirmed between the fiber bundles. Further, when the state of the plane in the inside was observed by slicing near the boundary between the polyurethane foam layer and the non-woven fabric layer, indefinite cellular cavities were present and independent cavities or partially connected cellular cavities could be confirmed.

Example 12

A circular knitted boa was knitted by using cut pile yarns formed by joining two false twist yarns used in Example 5 into 300 denier and false twist yarns of polyethylene terephthalate with 150 denier as base yarns.

The circular boa knitted fabric was cut into 30 cm square, which was dipped being extended into water and irradiated with microwaves of 1 KW at 2450 MHz. By the irradiation of the microwaves, evolution of bubbles from the inside of the pile surface of the knitted fabric was observed. After keeping the irradiation for about one minute from the evolution of the bubbles, the knitted fabric was taken out, cooled in water and dried by centrifugal dewatering to obtain a fibrous structure having cellular cavities on the surface and in the inside.

Then, the fibrous structure was heat press bonded using a calender roll at a press bonding temperature of 180 ° C. and under a roll linear pressure of 5 kg/cm. The thus obtained fibrous multi-layer composite had a smooth and dense surface layer, in which a fibrous layer having cellular cavities was formed adjacent to the lower surface of the dense layer.

Example 13

Core/sheath composite staple fibers with 3 denier, 64 mm cut length and 7% crimping extension were obtained by using identical conjugated fibers with those used in Example 5. 100% of core/sheath composite staple fibers thus obtained were carded to obtain a needle punched non-woven fabric with 90 /cm² of needle punching density, 10 mm thickness and 300 g/m² of weight.

The needle punched non-woven fabric was thoroughly impregnated with water at a ordinary temperature and microwaves of 1 KW at 2450 MHz were irradiated while the non-woven fabric was kept in water by nets. Irradiation was continued for two minutes after confirming the evolution of bubbles from the non-woven fabric. After treatment, the non-woven fabric was taken out and dipped in cooling water at a ordinary temperature for cooling and settling. Then, after centrifugal dewatering, it was dried at a dry heat of 110° C.

In the cross section of the thus obtained non-woven fabric, fiber bundles penetrating in the direction of the thickness were distributed substantially uniformly as needling traces and a number of large cellular cavities of 1 mm to 5 mm were confirmed between the fiber bundles. On the other hand, when the inner state of the non-woven fabric was observed by slicing the surface thereof, indefinite cellular cavities were present, and independent cavities and partially connected cellular cavities could also be confirmed.

Then, both surfaces of the non-woven fabric were introduced to a calender roll and the both surfaces were heat press bonded at 180° C. A fibrous multi-layer composite in which smooth and dense surface layers were formed on both surfaces and a fibrous layer having the cellular cavities was formed in the inner layer adjacent to the surface was obtained.

Example 14

Using the circular knitted boa in Example 12, a dense fiber melted layer was formed prior to the irradiation of microwaves. That is, the surface of the circular knitted boa was heat press bonded using a calender roll at a bonding temperature of 180° C. and a roll linear pressure of 5 kg/cm.

The obtained fibrous-structure had a dense layer with smooth surface. The fibrous structure was dipped in water and irradiated with microwaves with 1 KW at 2450 MHz. Evolution of bubbles from the inside of the pile surface of the knitted fabric by the irradiation of microwaves was observed. After continuing irradiation for about one minute from the evolution of the bubbles, the structure was taken out and cooled in water, dried by centrifugal dewatering to recognize that a fibrous layer having cellular cavities was formed between the dense fiber melted layer and the support layer.

Example 15

The false twist yarns used in Example 5 were bundled into a tow and cut to 64 mm length to obtain crimped staple fibers.

Manufacture of Shaping Product

The carded crimped staple fibers described above were charged into a rectangular shaping mold capable of penetrating liquid, sufficiently impregnated with water at a ordinary temperature, heated by a high frequency microwave device and applied with a heat treatment for about one minute from the evolution of bubbles. Then, the shaped product was cooled by cold water and then centrifugally dewatered to obtain rectangular fibrous shaped product for use in cleaning material. The shaped product had an apparent density of 0.07 g/cm$^3$ and a dry compression ratio of 22%.

When the fibrous shaped product for use in the cleaning materials in this embodiment was used, foaming with soap and synthetic detergent were favorable like that commercially available sponge and droplets after cleaning could be wiped off like that with cotton products.

Comparative Example 1

A needle punched non-woven fabric at a punching density of 150 /cm$^2$, 200 g/m$^2$ of weight and 5 mm thickness was obtained by using 70% core/sheath composite staple fibers used in Example 1 and 30% polyethylene terephthalate staple fibers with 3 denier and 51 mm cut length.

The needle punched non-woven fabric was sufficiently impregnated with water at a ordinary temperature and then kept into hot water at 90° C. and applied with a wet heat treatment for 30 seconds while being kept in water by nets. After the treatment, the non-woven fabric was taken out and dipped in cooling water at a ordinary temperature for cooling and settling. Then, after centrifugal dewatering, it was dried at a dry heat of 110° C.

The resultant non-woven fabric was poor in the entanglement between the fibers and presence of the cellular cavities could not be recognized in the cross section.

Comparative Example 2

A needle punched non-woven fabric at a punching density of 150 /cm$^2$, 220 g/m$^2$ of weight and 5 mm thickness was obtained by using a web comprising 70% raw wadding of polyethylene terephthalate staple fibers with 3 denier and 51 mm cut length and 30% binder fibers with 6 denier and 64 mm cut length of a melting point lower than the polyethylene terephthalate fibers (melting point 120° C.).

The needle punched non-woven fabric described above was sufficiently impregnated with water at a ordinary temperature and then dipped into hot water at 100° C. and applied with a wet heat treatment for 30 seconds while being kept in water by nets. After the treatment, the non-woven fabric was taken out and dipped in cooling water at a ordinary temperature for cooling settling. Then, after centrifugal dewatering, it was dried at a dry heat of 110° C.

The obtained non-woven fabric was poor in the entanglement between the fibers and the presence of the cellular cavities could not be recognized in the cross section.

Comparative Example 3

A needle punched non-woven fabric at a punching density of 130 /cm$^2$, 150 g/m$^2$ of weight and 3 mm thickness was obtained by using 40% core/sheath composite staple fibers used in Example 1 and 60% polyethylene terephthalate staple fibers with 3 denier, 51 mm cut length.

The non-woven fabric described above was applied with a dry heat treatment for two minutes at a temperature of 174° C. higher by 10° C. than the melting point of the polymer forming the sheath portion of the core/sheath composite staple fibers.

The thus obtained non-woven fabric was hard in feeling and gave stiffness and the presence of cellular cavities was not recognized in the cross section, only showing a three dimensional entangled state.

Comparative Example 3

A fiber bundle of 10,000 denier was prepared by gathering 7% false twist yarns used in Example 5 and 93% polyethylene terephthalate false twist yarns with 150 denier, which was cut into 5 cm length. The cut product was tightly tied by the wet heat bonding false twist yarns described above at a position bisecting the length thereof, to obtain constrained fiber bundles with free ends.

After placing the fiber bundles in a cylindrical vessel capable of containing liquid and a sufficient amount of water at a ordinary temperature to allow the bundles to be dipped therein and applying a heat treatment by irradiation of high frequency microwaves, the shaped product was cooled by cold water. The crimping was developed only for the false twist yarns and a fibrous product having the cellular cavities could not be obtained.

Comparative Example 4
Manufacture of Circular Corrugated Knitted Fabric

A circular knitted corrugated knitted fabric with 4 mm thickness and 620 g/m$^2$ of weight was obtained by knitting the knitted yarn used in Example 5 and false twist yarns of 48 filament polyethylene terephthalate knitted yarns of 150 denier knitted by using a double knitting machine at 30 inch, 20 gauge in the identical knitting pattern as in Example 8 and applied with a heat treatment under the same conditions as those in Comparative Example 1.

The state of the thus obtained circular corrugated knitted fabric showed no change before and after the heat treatment and no cellular cavities could be found in the fibrous layer.

Comparative Example 5

Procedures were conducted by using quite identical circular corrugated knitted fabric with that in Comparative Example 4 while replacing the heat treatment conditions with dry heat treatment at a temperature of tenter of 180° C.

In the thus obtained circular corrugated knitted fabric, only the connecting yarns were adhered in a mono filament-like shape but neither the sponge layer nor the cellular cavities structure was formed, although melting was confirmed between some of the connecting yarns.

Comparative Example 6

A needle punched non-woven fabric with a punching density of 90 /cm$^2$, 300 g/m$^2$ of weight and 10 mm thickness was obtained by mixing and carding 6% core/sheath composite staple fibers used in Example 13 and 94% polyethylene terephthalate staple fibers with 3 denier and 61 mm cut length.

The needle punched non-woven fabric described above was impregnated with water, and irradiated with microwaves of 1 KW at 2450 MHz. After confirming the evolution of bubbles from the inside of the non-woven fabric, irradiation was continued for two minutes. Then, after cooling in cold water, both surfaces of the non-woven fabric were introduced to a calender roll and the both surfaces were heat press bonded at 180° C.

The non-woven fabric thus obtained was poor in entanglement between the fibers and the structure of the cellular cavities could not be found. Further, formation of the dense layer was not found on the surface of the non-woven fabric and melting and solidification between the fibers could not be found, while the fiber cross sections are deformed under pressure.

Merits of the Invention

This invention can provide a novel fibrous structure having entangled structure of fibers and cellular cavities together and having large cavities, as well as a process for producing the porous fibrous structure using water and heating only.

Japanese Patent application 11-293679 filed Oct. 15, 1999, is incorporated herein by reference.

What is claimed is:

1. A process for producing a porous fibrous structure, comprising:

impregnating a fibrous structure comprising from 10 to 100% by weight of wet heat bonding fibers with water to obtain a water-containing fibrous structure;

heating said water-containing fibrous structure to generate bubbles by boiling said water in said water-containing fibrous structure to obtain a heated fibrous structure; and forming a plurality of indefinite cavities in the inside of said heated fibrous structure and, simultaneously, heat bonding at least a portion of the fibers constituting said fibrous structure to said wet heat bonding fibers, to obtain said porous fibrous structure.

2. The process according to claim 1, wherein an ethylene-vinyl alcohol copolymer is present on at least a portion of a surface of said wet heat bonding fibers.

3. A process for producing a porous fibrous structure, comprising:

immersing, into an aqueous layer, a fibrous structure comprising from 10 to 100% by weight of wet heat bonding fibers, to obtain a water-containing fibrous structure; wherein a content of said wet heat bonding fibers is lower on one surface of said fibrous structure while the content of the wet heat bonding fibers in another portion is higher; and heating said water-containing fibrous structure thereby generating bubbles by boiling water in said water-containing fibrous structure to obtain a porous fibrous structure having a dense layer on one surface of said porous fibrous structure and having a porous fibrous layer in contiguous with said dense layer.

4. The process according to claim 1, wherein said water-containing fibrous structure is heated by irradiation with high frequency microwaves.

5. A process for producing a porous fibrous multi-layer composite, comprising:

heating a water-containing fibrous structure comprising from 10 to 100% by weight of wet heat bonding fibers by irradiation with high frequency microwaves thereby generating bubbles by boiling water in said water-containing fibrous structure, to obtain a porous fibrous multi-layer composite having a dense layer on one surface of a porous fibrous structure and having a porous fibrous layer in contiguous with the dense layer;

wherein said heating proceeds while at least a portion of a surface layer of said water-containing fibrous structure is exposed to atmospheric air.

6. A process for producing a porous fibrous structure, comprising:

constraining a fiber bundle comprising from 10 to 100% by weight of wet heat bonding fibers at an arbitrary portion thereof to obtain a constrained fiber bundle;

impregnating said constrained fiber bundle with water, to obtain an impregnated fiber bundle;

applying a wet heat treatment to said impregnated fiber bundle while generating bubbles by boiling water in said impregnated fiber bundle, to obtain a wet heat treated fiber bundle; and cooling said wet heat treated fiber bundle.

7. A process for producing a porous fibrous multi-layer composite, comprising:

immersing a fibrous layer comprising from 10 to 100% by weight of wet heat bonding fibers in water to obtain a water-containing fibrous layer;

applying a heat treatment to said water-containing fibrous layer thereby generating bubbles by boiling water in said water-containing fibrous layer to form cellular cavities, to obtain a fibrous layer having cellular cavities; and heat press bonding at least one surface of the said fibrous layer having said cellular cavities to form an air permeable dense fiber melted layer.

8. A process for producing a porous fibrous multi-layer composite, comprising:

heat press bonding at least one surface of a fibrous layer comprising from 10 to 100% by weight of wet heat bonding fibers to form an air permeable dense fiber melted layer;

immersing the fibrous layer having said air permeable dense fiber melted layer into water to obtain a water-containing fibrous layer; and applying a heat treatment to said water-containing fibrous layer thereby generating bubbles by boiling water in said water-containing fibrous layer to form cellular cavities.

* * * * *